(12) United States Patent
Swisher et al.

(10) Patent No.: US 6,418,149 B1
(45) Date of Patent: Jul. 9, 2002

(54) BI-DIRECTIONAL PREMISES WIRING SYSTEM AND METHOD

(75) Inventors: James Swisher, Santa Clara; Steven Sheppard, Sebastopol, both of CA (US)

(73) Assignee: Next Level Communications, L.P., Rohnert Park, CA (US)

( * ) Notice: Subject to any disclaimer, the term of this patent is extended or adjusted under 35 U.S.C. 154(b) by 0 days.

(21) Appl. No.: 09/456,921

(22) Filed: Dec. 7, 1999

(51) Int. Cl.[7] .............................. H04J 1/00; H04N 7/173
(52) U.S. Cl. ........................................ 370/487; 725/128
(58) Field of Search .................................. 370/465, 468, 370/473, 480, 482, 485, 486, 487, 488, 493, 494, 495, 497, 501; 725/105, 111, 114, 120, 121, 87, 144, 147, 148, 149, 74, 78, 118, 128

(56) References Cited

U.S. PATENT DOCUMENTS

| | | | |
|---|---|---|---|
| 5,495,212 A | * 2/1996 | DeCramer | 333/25 |
| 5,765,097 A | 6/1998 | Dail | 725/125 |
| 5,768,682 A | 6/1998 | Peyrovian | 725/104 |
| 5,774,527 A | 6/1998 | Handelman et al. | 379/93.07 |
| 5,838,268 A | * 11/1998 | Frenkel | 341/11 |
| 5,959,658 A | 9/1999 | Gnauck et al. | 725/151 |
| 6,069,899 A | * 5/2000 | Foley | 370/494 |

* cited by examiner

*Primary Examiner*—Chau Nguyen
*Assistant Examiner*—Soon-Dong Hyun
(74) *Attorney, Agent, or Firm*—Covington & Burling

(57) ABSTRACT

The present invention provides a system and method for using existing wiring or cabling in a residence or other customer premises both (a) to transmit network telecommunications to a gateway or similar device for processing, and (b) to distribute processed signals from the device to video, telephony and data receivers. The invention enables and facilitates the receipt by telephone company subscribers of high-speed digital telecommunications over twisted-wire pair cabling historically installed and used for voice telephone service. In an embodiment, the system of the present invention comprises a bidirectional transmission facility, a first diplexer, and a second diplexer; the first diplexer receives network signals and transmits them or passes them on, using the bidirectioal transmission facility, to the second diplexer; and the second diplexer receives distribution signals and transmits them or passes them on, using the bidirectional transmission medium, to the first diplexer.

28 Claims, 7 Drawing Sheets

BI-DIRECTIONAL PREMISES WIRING SYSTEM AND METHOD

BACKGROUND OF THE INVENTION

This invention relates to the transmission of telecommunications signals in two directions over a single transmission facility installed in a customer premises, such as a residence environment. More specifically, this invention relates to the transmission, over a transmission facility in a customer premises, of network telecommunications signals in a first direction for processing by a gateway or other device, and the simultaneous transmission of the processed telecommunications signals in a second direction for distribution to receiving devices.

DESCRIPTION OF THE RELEVANT ART

Growing consumer demand for video and high-speed data services has prompted increased competition to deliver those services to residences and other customer premises. Frequently, different transmission facilities connecting a residence to a telecommunications network are owned and operated by different entities. For example, cable television service is typically provided by a cable operator over a cable system that is generally distinct from the local telephone network owned and operated by a local telephone company.

Different telecommunications systems and networks offer advantages and disadvantages. Cable systems, for example, usually deploy coaxial cable all the way to the residence, which provides substantial capacity for multiple channels of video programming as well as high-speed data services increasingly demanded by Internet users, for example. Traditional cable systems, however, were not initially configured to support signal transmission from the home to the network controller or headend, and thus may not be well equipped to provide fully interactive high speed services. Telephone companies, in contrast, have almost always built their voice telephony networks to support two-way switched communications. However, telephone networks historically have connected households to the telephone network with twisted wire pairs, which were initially designed for voice telecommunications, requiring much less telecommunications capacity than high-speed data transmissions.

Many telephone companies have thus worked to find ways to utilize their existing twisted wire pair infrastructure to support high speed data transmissions to residences and other customer premises. This has led to the development of technologies such as digital loop and Digital Subscriber Line (DSL) that enable use of twisted wire pair facilities for the transmission of high speed digital signals that may include telephony, video and data services. Once high speed data transmissions reach the home, for example, they may be fed to a gateway or other device for processing into telephony signals, video signals and data signals for distribution and receipt by telephone, television and computer devices. A gateway device for this purpose is described in co-pending U.S. application Ser. No. 09/026,036, VIDEO, DATA AND TELEPHONY GATEWAY, which is hereby incorporated by reference into this specification.

The actual installation of such gateway or other devices in a customer's premises may lead to additional challenges. A gateway or similar device may need to be located where it is readily accessible to users, or where is can readily receive signals from remote controllers used to communicate with the device. The configuration of the wiring or cabling in the residence or other environment may not readily permit the use of one facility (e.g., a twisted wire pair or a coaxial cable) for delivering the network signals to a convenient location for the gateway or similar device and the use of a second facility to distribute signals from that location to the various receivers throughout the premises.

There is accordingly a need for a system and method for using existing wiring or cabling in a residence or other customer premises both to transmit network telecommunications signals to a gateway or similar device for processing, and to distribute processed signals from the device to video, telephony and data receivers.

SUMMARY OF THE INVENTION

It is an object of the present invention to use a transmission facility in a residence or other customer premises for the bidirectional transmission of telecommunications signals.

It is a further object of the present invention to utilize pre-existing wiring or cabling in a residence or other customer premises for the bidirectional transmission of telecommunications signals.

It is an additional object of the present invention to use of transmission facility in a residence or other customer premises the transmission in one direction of network telecommunications signals and in a second direction of processed telecommunications signals for distribution to receiving devices.

It is a further object of the present invention to utilize pre-existing wiring or cabling or cabling in a residence or other customer premises for the transmission in one direction of network telecommunications signals and in a second direction of processed telecommunications signals for distribution to receiving devices.

In summary, the present invention provides a system for simultaneous bidirectional transmission of network signals and distribution signals, comprising a bidirectional transmission facility, a first diplexer and a second diplexer. In the system of the present invention the first diplexer receives network signals and transmits them or passes them on, using the bidirectional transmission facility, to the second diplexer, and where the second diplexer receives distribution signals and transmits them or passes them on, using the bidirectional transmission medium, to the first diplexer. In a preferred embodiment, the second diplexer transmits or passes the network signals it receives to a gateway or similar device for processing, and the distribution signals are the processed network signals received by the second diplexer and transmitted or passed to the first diplexer for distribution to receiving devices. In preferred embodiments, the network signals comprise xDSL signals encoding video signals, and the distribution signals comprise television radio frequency ("rf") signals. Such xDSL signals may include, for example, Very High Speed DSL (VDSL), Asynchronous DSL (ADSL), Quadrature Amplitude Modulation, Discrete Multitone and Carrierless and Amplitude and Phase Modulation schemes.

In some cases, the bidirectional transmission facility (e.g., coaxial cable) may have transmission characteristics that do not correspond to those of a transmission facility that connects with the bidirectional transmission medium (typically via a diplexer) for the transmission of network or distribution signals. In these situations, a preferred embodiment of the present invention provides a system and method for converting signals transmitted using the connecting transmission facility for transmission using the bidirectional transmission facility.

The present invention also provides an impedance converter for converting network or distribution signals transmitted using a first transmission medium, such as twisted wire pair cable, for transmission using a second transmission medium, such as coaxial cable.

The present invention further provides a method for the bidirectional transmission of network and distribution signals, comprising the steps of interfacing the first end of a bidirectional transmission facility with a network connection and a distribution facility, and interfacing the second end of the bidirectional transmission facility with gateway connection and a gateway return. The interfacing steps are accomplished so that, at the first end of the bidirectional transmission facility, network signals are received and transmitted in a first direction, and distribution signals that have been transmitted in the second direction are also received and transmitted to receiving devices using a distribution facility. The interfacing steps are also accomplished so that, at the second end of the bidirectional transmission facility, network signals transmitted to that end are received and distribution signals are received and transmitted in the opposite direction toward the first end of the bidirectional transmission facility. Preferred embodiments also include steps for matching the transmission characteristics of the bidirectional transmission facility with those of the facilities used to transmit network and distribution signals.

Additional objects and advantages of the invention are set forth in part in the description which follows, and in part are obvious from the description, or may be learned by practice of the invention. The objects and advantages of the invention may also be realized and attained by means of the instrumentalities and steps particularly set forth in the appended claims.

BRIEF DESCRIPTION OF THE DRAWINGS

The accompanying drawings, which are incorporated in and form a part of the specification, illustrate the embodiments of the present invention and, together with the description, serve to explain the principles of the invention.

In the drawings.

DETAILED DESCRIPTION OF THE PREFERRED EMBODIMENTS

Figure 1:
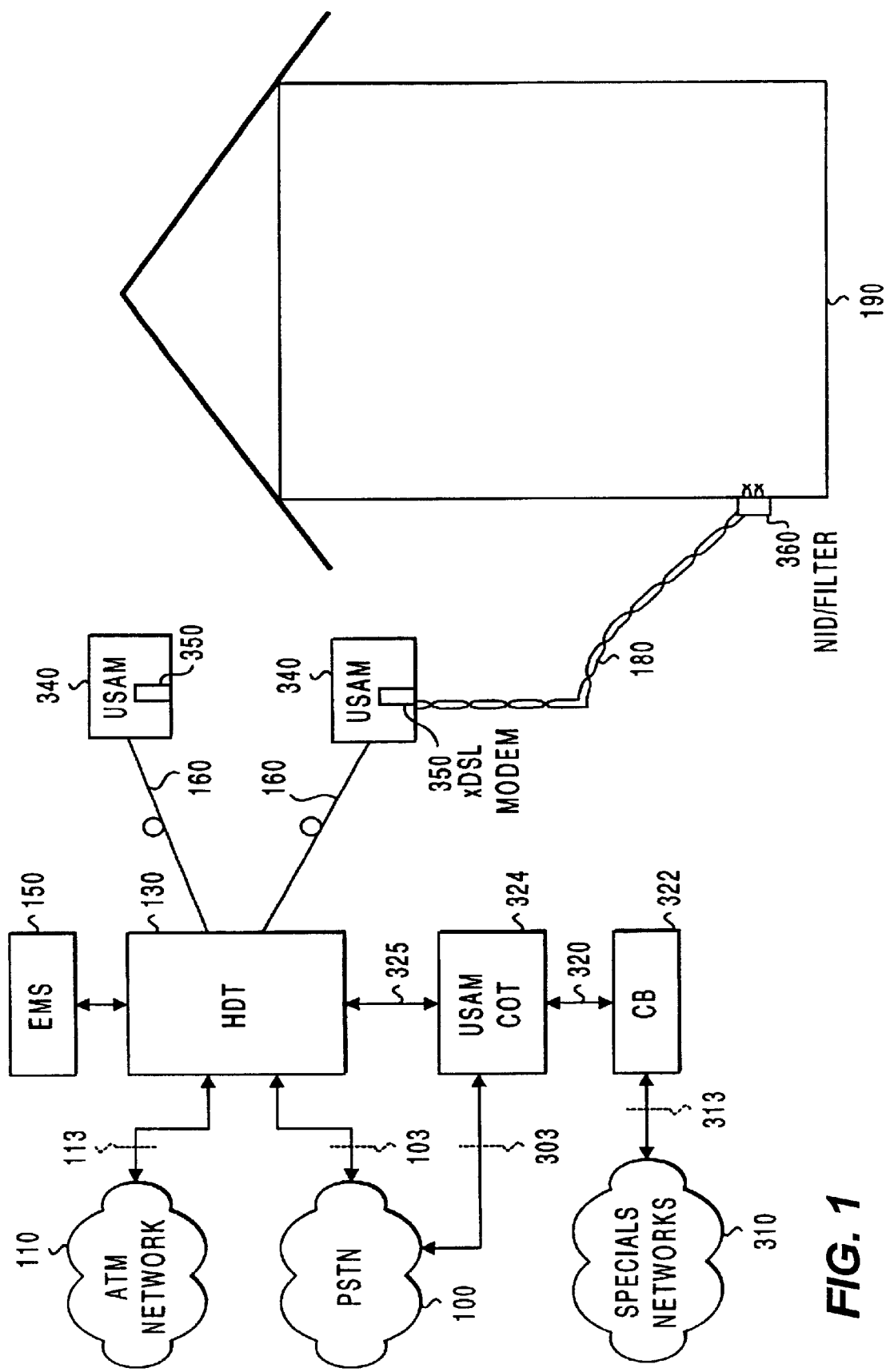
FIG. 1 illustrates a fiber-to-the-curb telecommunications access system, with a twisted wire pair cable drop to a residence.

In describing the preferred embodiments of the invention illustrated in the drawings, specific terminology will be used for the sake of clarity. However, the invention is not intended to be limited to the specific terms so used, and it is to be understood that each specific term includes all equivalents.

Reference is now made in detail to the present preferred embodiments of the invention, examples of which are illustrated in the accompanying drawings and described in the following description, wherein like reference numerals indicate like elements throughout the several views.

FIG. 1 illustrates a fiber-to-the-curb (FTTC) network in which a residence 190 is served by the public switched telephone network (PSTN) 100 or Asynchronous Transfer Mode (ATM) network 110. FIG. 1 illustrates a telecommunications network serving a customer premises 190, such as a residence, hotel or office in which the system or method of the present invention could be used. In particular, as depicted in FIG. 1, twisted wire pair cable 180 is used to provide the last link in the connection between the telecommunications network and the residence 190. Other contexts in which the system or method could be used are readily apparent or can be identified through use of the invention.

The FTTC network illustrated in FIG. 1 works by connecting a Host Digital Terminal 130 to the PSTN 100 and/or ATM network 110. The PSTN-HDT interface 103 is specified by standards bodies, and in the United States are specified by Bellcore specification TR-TSY-000008, TR-NWT-000057 or TR-NWT-000303. The HDT 130 can also receive special services signals from private or non-switched public networks. The physical interface to the PSTN is, in FIG. 1, twisted wire pairs carrying DS-1 signals, or optical fibers carrying OC-3 signals.

The interface to the ATM-network-HDT interface 113 can be realized using an OC-3 or OC-12c optical interfaces, or other appropriate interfaces, carrying ATM cells. In a preferred embodiment, HDT 130 has to OC-12c broadcast ports, which can only receive signals carrying ATM cells, and one OC-12c interactive port which can receive and transmit signals.

An element management system (EMS) 159 is connected to HDT 100 and is used to provision services and equipment on the FTTC network, in the central office where the HDT 130 is located, in the field, or in the residences or other premises service by the HDT. The EMS 150 depicted in FIG. 1 may be software based, and could run on a personal computer, in which case it may support one HDT 130 and the associated access network equipment connected to it, or can run on a workstation, in which case additional HDTs and access networks may be supported.

As depicted in FIG. 1, a Universal Service Access Multiplexor (USAM) 140 is located in the serving area, and is connected to HDT 130 via optical fiber 160. An xDSL modem 350 provides for the transmission of high-speed digital data over the twisted wire pair drop cable 180 to and from the customer premises 190. As depicted in FIG. 1, traditional analog telephone signals are combined with the digital signals for transmission to the customer premises 190, and a network interface device (NID)/filter 360 may be used to separate the analog telephone signals from the digital signals.

The telecommunications network configuration illustrated in FIG. 1 includes a Universal Service Access Multiplexor Central Office Terminal (USAM-COT) 324 connected to HDT 130 via a connection 325, which in a preferred embodiment is an STS3c signal transmitted over a twisted wire pair. The PSTN-USAM-COT interface 303 depicted in FIG. 1 is one of the Bellcore interfaces identified above.

A channel bank (CB) 322 is also used in the central office to connect special networks 310, comprised of signals from special private or public networks via the special network-CB interface 313. In a preferred embodiment, the CB-USAM connections 320 are DS1 signals over twisted wire pairs.

The telecommunications network depicted in FIG. 1 is illustrative. Any number of other configurations, using for example fiber optic, twisted wire pair, radio or other transmission means, and Optical Network Units and other devices, could be used, as known to one of skill in the art, in order to deliver telecommunications signals of various types, formats and speeds to residences and other customer premises.

Figure 2A:
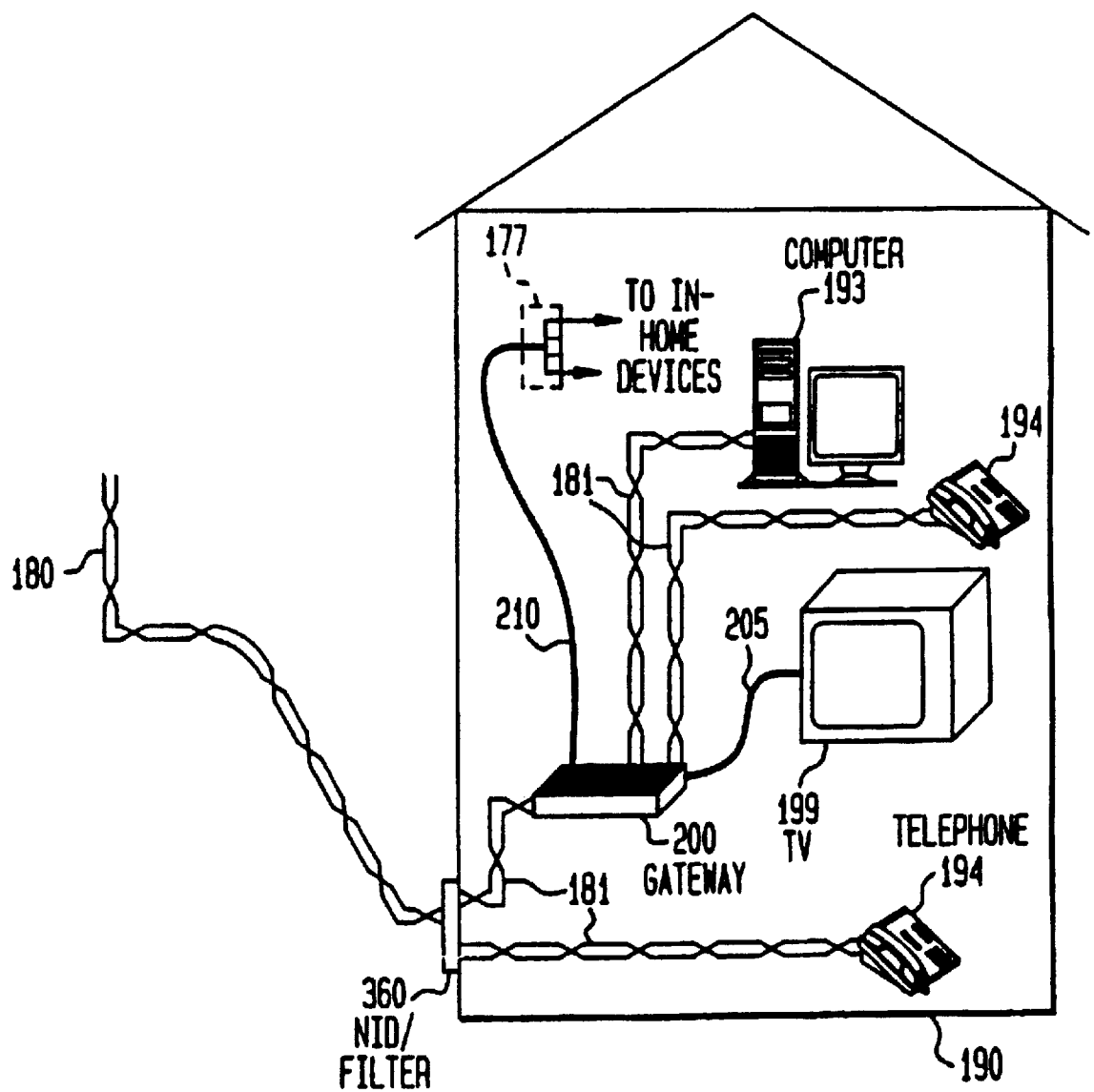
FIGS. 2A, 2B and 2C illustrate customer premises equipped with a gateway and various devices for receiving video, data and telephony signals.

FIG. 2A depicts an example of a customer premises 190, in this depiction a residence equipped with a gateway 200, which serves as the interface between the network signals and the devices in the residence 190, including television 199, computer 193 and telephone 194. As depicted in FIG. 2A, network video, data and telephony signals are received from the telecommunications network at NID 360 via twisted wire pair 180. NID 360 serves as the interface or demarcation point between the telecommunications network twisted wire pair 180 and the residence 190 customer premises wiring and equipment. The network video, data and telephony signals are transmitted to gateway 200 via twisted wire pair 181. Gateway 200 processes these signals for transmission to and receipt by various in-home devices, as depicted in FIG. 2A. This may, for example, include transmission over twisted wire pair 181 to computer 193 and telephone 194, over coaxial cable 205 to television 199, or over coaxial cable 210 to splitter 177 for transmission to other in-home devices.

The gateway 200 depicted in FIG. 2A and the other figures incorporated in this specification is described, for example, in co-pending U.S. application Ser. No. 09/026,036. Other devices are known to those of skill in the art for processing network signals for distribution to and receipt by receiving devices, or for otherwise interfacing telecommunications networks and customer premises distribution systems.

Although FIG. 2A illustrates gateway 200 located inside the living area of residence 190, the gateway 200 can be located in the basement, in the garage, in a wiring closet or on an outside wall of the residence 190, in the attic, or in any of the living spaces. For outside locations, gateway 200 will customarily require a hardened enclosure and components which work over a larger temperature range than those used for a gateway located inside residence 190. Techniques for developing hardened enclosures and selecting temperature tolerant components are known to those skilled in the art.

Pertinently, the configuration depicted in FIG. 2A provides a separate twisted wire pair connection 181 between NID 360 and gateway 200. The wiring and other characteristics of residence 190 may make it necessary or desirable to install twisted wire pair 181 at the time gateway 200 is installed, or to use pre-existing twisted wire pair cabling inside residence 190.

Figure 2B:
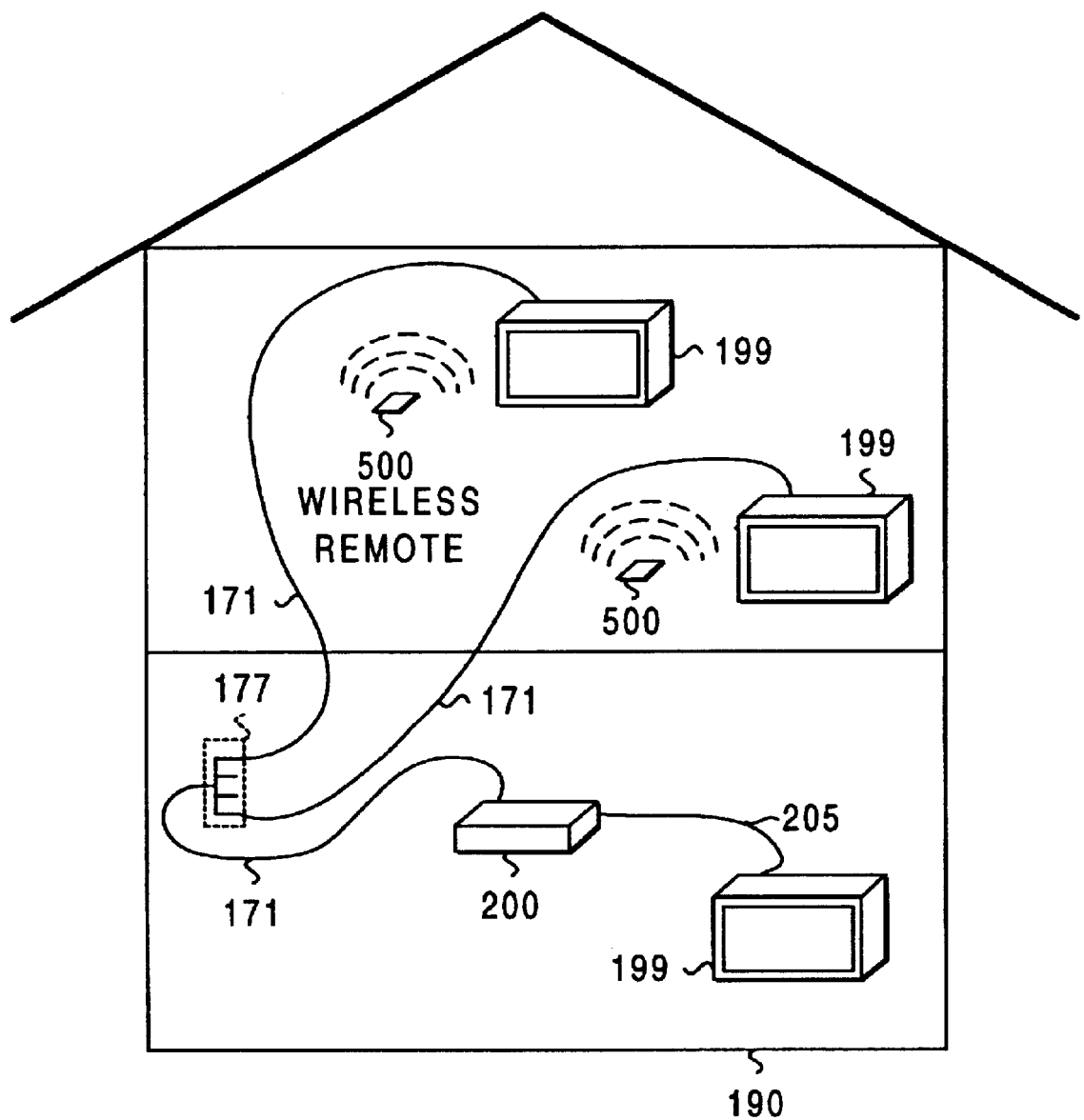

FIG. 2B illustrates a method of controlling gateway 200 based on the use of a wireless remote 500 which transmits a UHF signal to a UHF receiver included in gateway 200. Such techniques are known to those of skill in the art.

Figure 2C:
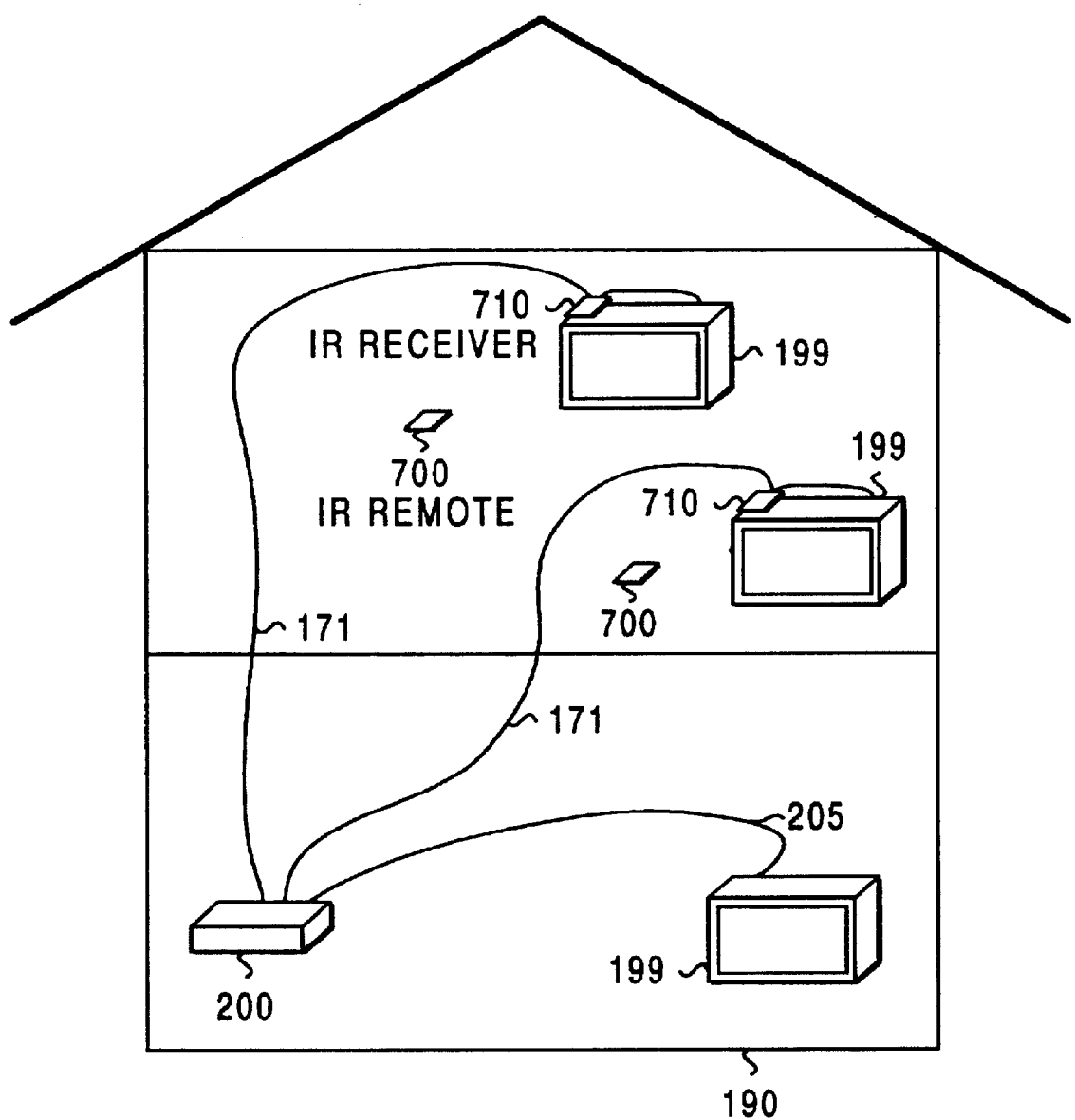

FIG. 2C depicts the installation of gateway 200 in a residence 190 where there is point-to-point in-home coaxial wiring, and where the gateway 200 can be located near the point where the coaxial cable originates. In the configuration illustrated in FIG. 2C, control of the gateway 200 from locations in the residence is accomplished by means of return signals transmitted on the point-to-point in-home coaxial cable wiring. For example, as depicted in FIG. 2C, an infra-red (IR) receiver 710 is associated with television 199, receives IR signals form IR remote controller 700 and converts the IR signal to an electrical signal which is transmitted over the coaxial cable to a remote control components and circuitry in gateway 200. Similar techniques for controlling gateway 200 are known to those of skill in the art.

Experience with the installation of gateways and similar devices in residences and other customer premises teaches that the exemplary configurations depicted in FIGS. 2A, 2B and 2C may not be possible or practical in actual practice. For example, it may not be economic or even possible to install twisted wire pair cable in a residence between a network interface device and a location suitable for a gateway. Similarly, it may not be economic or possible, in a customer premises equipped with point-to-point coaxial cable installed at the time of initial construction, to locate the gateway where the point-to-point cable originates or enters the premises. More generally, the configuration of pre-existing customer premises wiring, as well as the necessity or desirability of certain locations for a gateway or similar device, has in many instances prompted the need to use pre-existing customer premises wiring both to transmit network signals to a gateway or similar device and to transmit signals processed by the device for distribution to in-home receiving devices.

Figure 3:
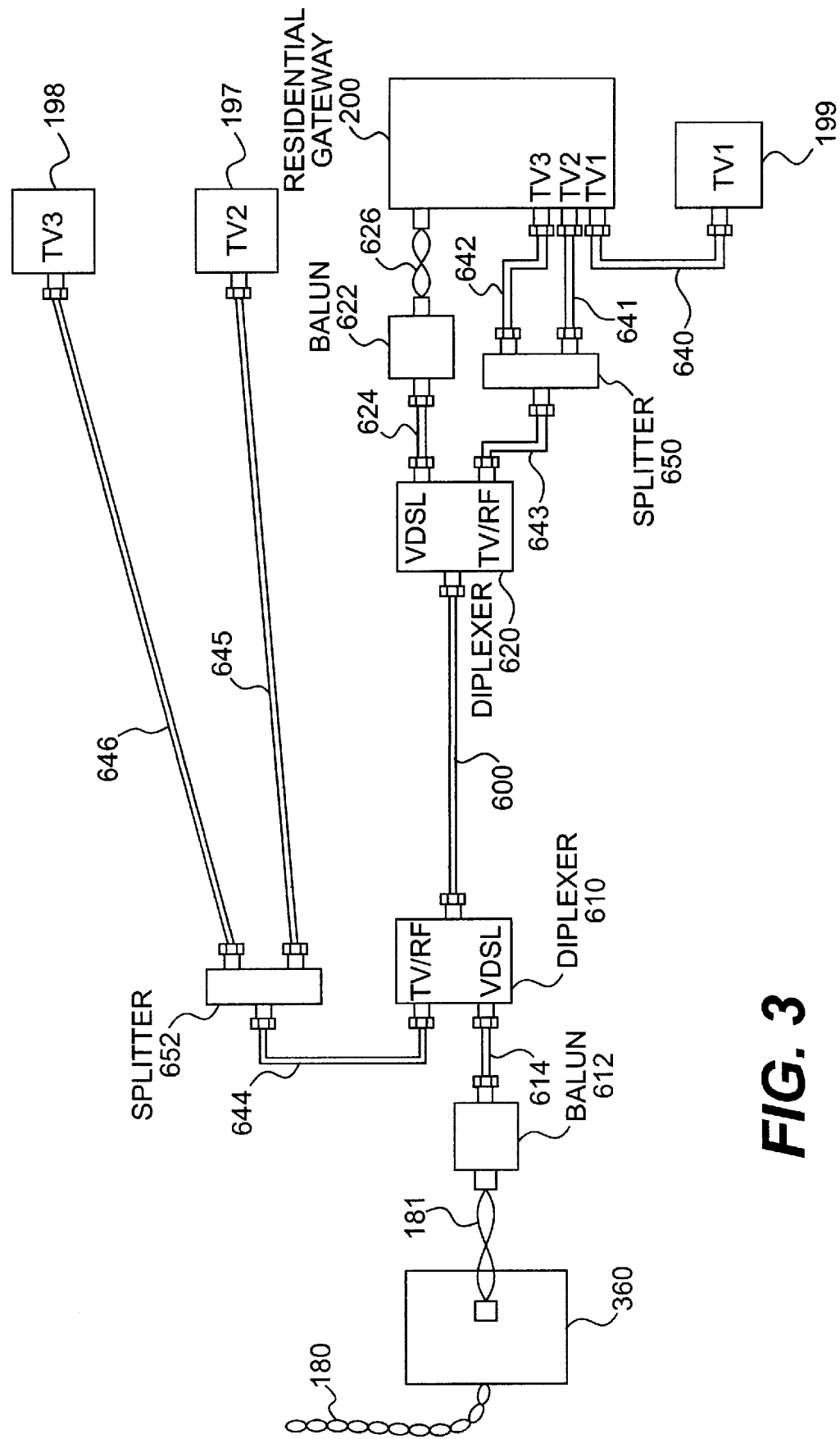
FIG. 3 illustrates a preferred embodiment of the system of the bidirectional transmission system of the present invention.

FIG. 3 depicts a preferred embodiment of the system of the present invention. As depicted in FIG. 3, The system, capable of simultaneous bidirectional transmission of network and distribution signals, comprises bidirectional transmission facility 600, first diplexer 610 and second diplexer 620. In the preferred embodiment depicted in FIG. 3, first diplexer 610 is connected to a first-diplexer input system 612, which receives network signals transmitted using twisted-wire pair 181 and converts them for transmission using coaxial cable 614 to first diplexer 610. First diplexer 610 receives network signals from first-diplexer input system 612 and passes those signals to bidirectional transmission facility 600 for transmission in a first direction—i.e., toward second diplexer 620 and gateway 200.

As depicted in FIG. 3, second diplexer 620 transmits network signals received using bidirectional transmission facility 600 to coaxial cable 624 for transmission to second-diplexer output system 622. Second-diplexer output system 622 converts those signals for transmission via twisted wire pair 626 to gateway 200. In the preferred embodiment depicted in FIG. 3, each of first diplexer input system 612 and second diplexer output system 622 is an impedance converter or balun for matching the transmission characteristics, respectively, of balanced twisted wire pair 181 with unbalanced coaxial cable 614 and of unbalanced coaxial cable 624 with twisted wire pair cable 626.

As also depicted in FIG. 3, second diplexer 620 receives distribution signals that have been processed by gateway 200 for transmission, using bidirectional transmission facility 600, toward diplexer 610. Thus, network signals are transmitted over bidirectional transmission facility 600 in a first direction, and distribution signals are transmitted over bidirectional transmission facility 600 in a second direction.

In the preferred embodiments depicted in FIG. 3 (and FIGS. 4 and 5), diplexers 610 and 620, first-diplexer input system 612 and second-diplexer output system 622 are passive devices. In alternate preferred embodiments, any or all of these devices may be active or passive devices. Accordingly, the term "transmit" as used in this specification and the appended claims encompasses both active transmission as well as inactive passing of signals (e.g., by passive devices) to a next component, device or transmission medium.

In a preferred embodiment, to avoid interference between the network signals and the distribution signals transmitted using the bidirectional transmission facility 600, different, non-overlapping frequency ranges are used to transmit the network signals and the distribution signals over that facility. Similarly, in a preferred embodiment, first diplexer 610 or second diplexer 620, or both, operate so that they receive and transmit network and distribution signals via bidirectional transmission facility using different and non-overlapping frequency ranges.

Other methods for avoiding interference between network and distribution signals may, for example, involve the use of orthogonal signals, such as a sine wave and a cosine wave, that can be separated although their frequency spectra may overlap. Yet another method for avoiding interference would be the use of overlapping digitally modulated signals such as code division multiple access transmissions. Other methods of creating overlapping but separable signals are well known to those skilled in the art. Other methods for avoiding interference between network and distribution signals may depend on the type, format and speed of the signals, and are known to those of skill in the art.

In the preferred embodiment depicted in FIG. 3, gateway 200 processes network signals into three sets of television signals, for distribution to Main TV 199 and TVs 197 and 198. In a preferred embodiment, gateway 200 transmits television signals in S-video format, via cable 640, to Main TV 199. In a preferred embodiment depicted in FIG. 3, gateway 200 also outputs television signals for TV 197 via coaxial cable 641 to combiner 650. Similarly, gateway 200 outputs television signals for TV 198 via coaxial cable 642 to combiner 650. In a preferred embodiment, these television signals for TV 197 and TV 198 are radio frequency television signals in National Television Standard Committee (NTSC) format. Combiner 650 combines these signals, using techniques and technologies known to one of skill in the art, for transmission via coaxial cable 643 to second diplexer 620. As described above and depicted in FIG. 3, diplexer 620 passes these these television signals to bidirectional transmission medium 600 for transmission in the second direction—i.e., toward diplexer 610.

In the preferred embodiment depicted in FIG. 3, diplexer 610 receives the television radio frequency signals and passes them to coaxial cable 644 for transmission to splitter 652. Using techniques and technologies known in the art, splitter 652 splits the television signals so that, in the preferred embodiment depicted in FIG. 3, television signals for TV 197 are transmitted using coaxial cable 645, and television signals for TV 198 are transmitted using coaxial cable 646.

The advantages of the present invention are readily apparent from the preferred embodiment depicted in FIG. 3, as well as from use of the invention. The invention may be used, for example, to take advantage of customer premises coaxial cabling already in place at the time a gateway or similar device is installed. Using the present invention, a gateway or similar device is not necessarily constrained to be located near the origination of a point-to-point in-home cable system and may, for example, be located in a more desirable or convenient location without disrupting existing cabling or requiring extensive new cabling.

Figure 4:
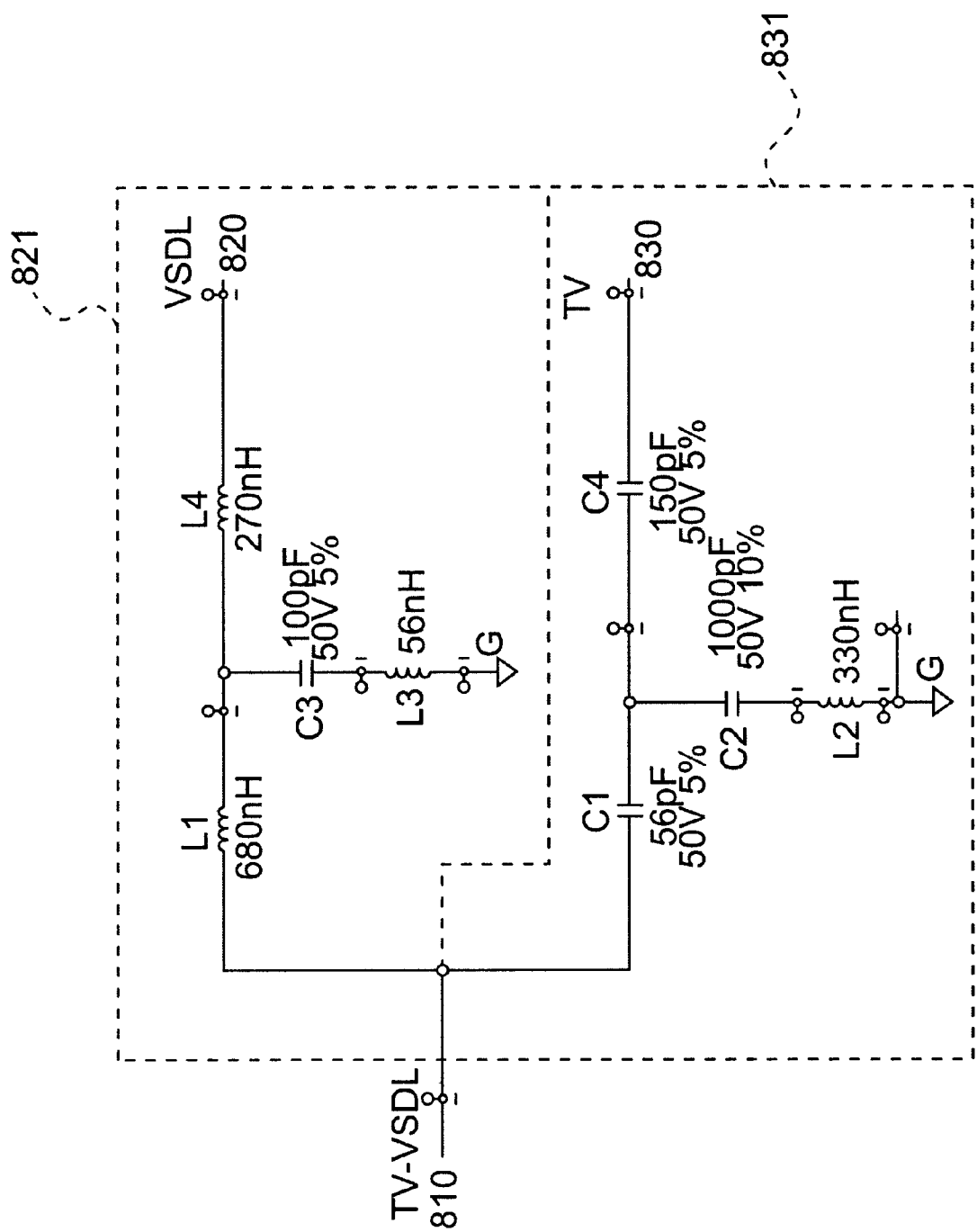
FIG. 4 provides a schematic diagram of a preferred embodiment of a diplexer for use with the system of the present invention.

FIG. 4 provides a schematic diagram of a preferred embodiment of diplexer 610 and diplexer 620. This preferred embodiment was designed to diplex VDSL and television/rf signals. In the preferred embodiment depicted in FIG. 4 diplexer 610 is comprised of a first port 810, a second port 820 and a third port 830. A first frequency selective section 821 separates out frequencies to be either received or transmitted at the second port 820. A second frequency selective section 831 selects receives selects a second set of frequencies to be received or transmitted at third port 830.

In a preferred embodiment, as illustrated in FIG. 4, the second frequency selective section 831 allows television rf signals to pass through while blocking VDSL signals in lower frequency ranges. The first frequency selective section 821 allows VDSL signals to pass through while blocking television rf signals in higher frequency ranges. As illustrated in FIG. 3, the diplexer illustrated in FIG. 4 is used both for combining the two sets of frequencies and for separating the signals. Although the system is illustrated with coaxial cable, other single ended transmission media can be used with the diplexer.

In a preferred embodiment, as depicted in FIGS. 3 and 4, the inputs and outputs, respectively, of diplexer 610 and diplexer 620, are not interchangeable. As more specifically depicted in FIG. 4, in a preferred embodiment port 830 is for TV/rf signals transmitted using coaxial cable, port 820 is for VDSL signals transmitted using twisted wire pair cable, and port 810 is for combined TV/rf and VDSL signals.

Figure 5:
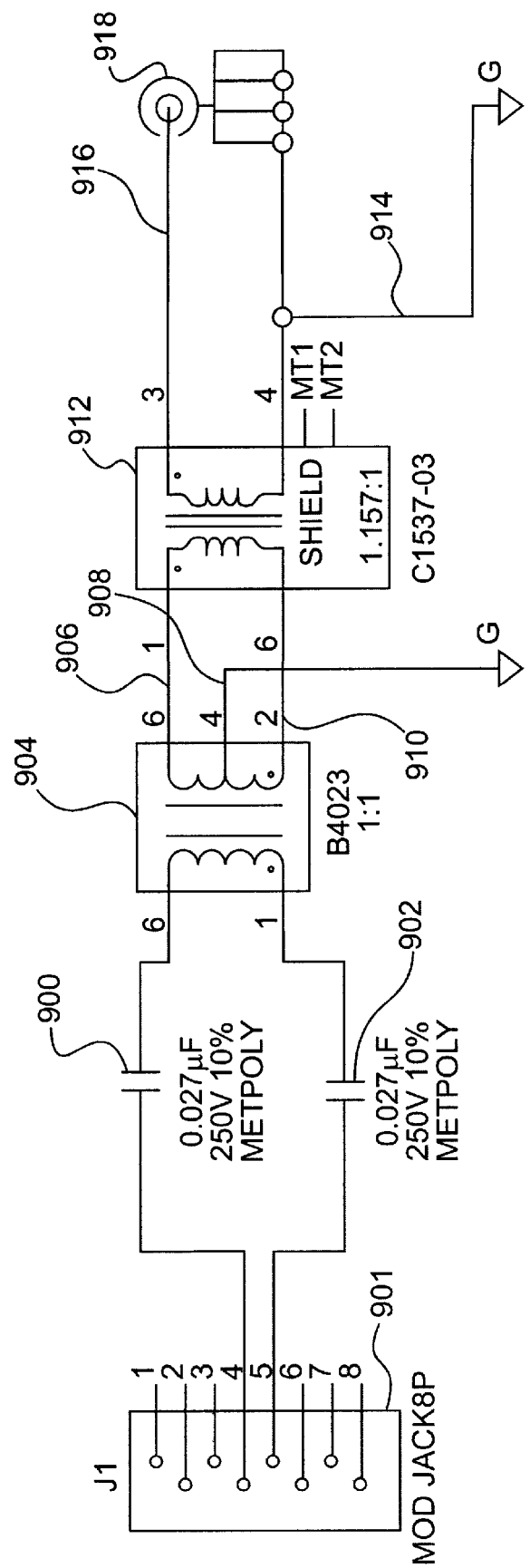
FIG. 5 provides a schematic diagram of a preferred embodiment of a balun or impedance converter for use with the system of the present invention.

FIG. 5 depicts a preferred embodiment of balun 612 and balun 622. This preferred embodiment was designed to match the impedance of twisted wire pair 181 or 626, as depicted in the FIG. 3, with the impedance of coaxial cable 614 or 624, respectively. In a preferred embodiment, these transmission facilities carry, among other signals, VDSL signals. Accordingly, in the design depicted in FIG. 5, careful attention was paid to balance and common mode rejection characteristics.

In the preferred embodiment depicted in FIG. 5, coaxial balun 621 is adapted for DSL modulation schemes. These include VDSL, ADSL, QAM, Discrete Multitone, Carrierless Amplitude and Phase Modulation and other such schemes as known in the art.

As shown in FIG. 5, a signal is received at a balun differential connector 901 and each of the differential signals passes through a capacitor. One line passes through first capacitor 900 and the other line passes through second capacitor 902. In a preferred embodiment the capacitors 900 and 902 are 0.027 microfarads. The differential signal is then received at transformer 904 which has on the output side on the second side a center tab 908 which is grounded and provides a shunt path to common mode. In a preferred embodiment, transformer 904 has a 1 to 1 turn ratio. Transformer 912 performs impedance matching with the bottom side of the transformer 912 being grounded and the top side 916 connecting to coaxial cable output 918. In a preferred embodiment transformer 912 has a 1.157 to 1 turn ratio.

In a preferred embodiment of the present invention, the network signals are VDSL signals transmitted using twisted wire pair and coaxial cabling, the distribution signals are television radio frequency signals transmitted over video or coaxial cable, and the bidirectional transmission facility is coaxial cable. The present invention may be readily adapted for the transmission of a variety of types of network and distribution signals, in different formats and speed (e.g., ADSL or xDSL signals), carrying a variety of different kinds of information (e.g., digital data or voice), or for the use of different transmission media, such as fiber optic cable, as known in the art. Such adaptations may require different designs for the first diplexer, the second diplexer, the first-diplexer input system and the second-diplexer output system of the present invention. Once the characteristics of the various transmission facilities and network and distribution signals are known, the different designs for those components could be developed by one of ordinary skill using techniques and components known to those of skill in the art.

The present invention also provides a method for bidirectional transmission of network and distribution signals, comprising the steps of interfacing the first end of a bidirectional transmission facility with a network connection and a distribution facility, and interfacing the second end of the bidirectional transmission facility with gateway connection and a gateway return. The interfacing steps are accomplished so that, at the first end of the bidirectional transmission facility, network signals are received and transmitted (or passed for transmission) in a first direction, and distribution signals transmitted in the opposite direction are also received and transmitted (or passed for transmission) to receiving devices using a distribution facility. The interfacing steps are also accomplished so that, at the second end of the bidirectional transmission facility, network signals transmitted in the first direction are received, and distribution signals are received and transmitted (or passed for transmission) in the opposite direction toward the first end of the bidirectional transmission facility. At the second end of the bidirectional transmission signals, the network signals are transmitted (or passed for transmission) using a gateway connection, and the distribution signals are received using a gateway return.

A preferred embodiment includes the steps of converting into distribution signals, at a gateway device, network signals transmitted to the gateway device using the gateway connection, and transmitting the distribution signals from the gateway device, using the gateway return, to the second end of the bidirectional transmission facility. Preferred embodiments also include the use of diplexers at the first and second ends of the bidirectional transmission facility, and the use of diplexer input and output systems, as necessary, to match the transmission characteristics of the network connection, the gateway connection or the other transmission facilities used in preferred or other embodiments of the invention. For example, in preferred embodiments, the bidirectional transmission facility, the distribution transmission facility and the gateway return comprise coaxial cable, while the network connection and the gateway connection comprise twisted wire pairs. In these embodiments, if the network signals are VDSL signals and the distribution signals are television/rf signals, then devices like diplexers 610 and 620 and diplexer output systems 612 and 622, depicted in FIG. 3, preferably would be use to diplex network and distribution signals and to match transmission facility characteristics, as described above.

It will be apparent to those skilled in the art that various modification can be made to this invention of a system and method for bidirectional customer premises wiring without departing from the scope or spirit of the invention. It is also intended that the present invention cover modifications, variations and equivalents of the system and method for bidirectional customer premises wiring within the scope of the appended claims.

We claim:

1. A system capable of simultaneous bidirectional transmission of network and distribution signals comprising:
    (a) a bidirectional transmission facility;
    (b) a first diplexer; and
    (c) a second diplexer;
    (d) wherein
        (i) the first diplexer receives network signals from a first-diplexer input system, comprising
            (A) a first transmission facility, comprising twisted-wire pair cable, connected to a source of network signals,
            (B) a second transmission facility, comprising coaxial cable, connected to the first diplexer, and
            (C) means, comprising an impedance converter, connected to the first transmission facility and the second transmission facility, for converting signals using the first transmission facility for transmission using the second transmission facility, and transmits the network signals, using the bidirectional transmission facility, to the second diplexer; and
        (ii) the second diplexer receives distribution signals and transmits the distribution signals, using the bidirectional transmission facility, to the first diplexer.

2. A system capable of simultaneous bidirectional transmission of network and distribution signals comprising:
    (a) a bidirectional transmission facility;
    (b) a first diplexer: and
    (c) a second diplexer;
    (d) wherein
        (i) the first diplexer receives network signals and transmits the network signals, using the bidirectional transmission facility, to the second diplexer;
        (ii) the second diplexer transmits the network signals to a second-diplexer output system, comprising
            (A) a first transmission facility, comprising coaxial cable, connected to the second diplexer,
            (B) a second transmission facility, comprising twist-wire pair cable, connected to a gateway device, and
            (C) means, comprising an impedance converter, connected to the first transmission facility and the second transmission facility, for converting signals using the first transmission facility for transmission using the second transmission facility; and
        (iii) the second diplexer receives distribution signals and transmits the distribution signals, using the bidirectional transmission facility, to the first diplexer.

3. A method for bidirectional transmission of network and distribution signals, comprising the steps of:
    (a) interfacing the first end of a bidirectional transmission facility with a network connection and a distribution facility, for
        receiving network signals transmitted using the network connection,
        transmitting the network signals in a first direction using the bidirectional transmission facility,
        receiving distribution signals transmitted in a second direction using the bidirectional transmission facility, and
        transmitting the distribution signals using the distribution facility; and
    (b) interfacing the second end of the bidirectional transmission facility with a gateway connection and a gateway return, for
        receiving the network signals transmitted in the first direction using the bidirectional transmission facility,
        transmitting the network signals using the gateway connection,
        receiving the distribution signals transmitted using the gateway return, and transmitting the distribution signals in the second direction using the bidirectional transmission facility.

4. The method of claim 3, further comprising the steps of converting into distribution signals, at a gateway device, network signals transmitted to the gateway device using the gateway connection; and transmitting the distribution signals using the gateway return toward the second end of the bidirectional transmission facility.

5. The method of claim 3, wherein the network connection comprises twisted wire pair cable.

6. The method of claim 3, wherein the network connection comprises coaxial cable.

7. The method of claim 3, wherein the first-end interfacing step comprises the step of connecting, to a first diplexer, the network connection, the first end of the bidirectional transmission facility and the distribution.

8. The method of claim 3, wherein the first-end interfacing step comprises the step of matching a transmission characteristic of the network connection with a corresponding transmission characteristic of the bidirectional transmission facility.

9. The method of claim 8, wherein the matching step comprises the step of using a first impedance converter in electrical series between the network connection and the first end of the bidirectional transmission facility.

10. The method of claim 9, wherein the first-end interfacing step comprises the step of connecting, to a first diplexer, the first impedance converter, the first end of the bidirectional transmission facility and the distribution facility.

11. The method of claim 3, wherein the distribution facility comprises coaxial cable.

12. The method of claim 3, wherein the distribution transmission facility comprises twisted-wire cable.

13. The method of claim 3, wherein the network signals comprise digital signals.

14. The method of claim 13, wherein the digital signals comprise xDSL signals.

15. The method of claim 3, wherein the distribution signals comprise digital signals.

16. The method of claim 3, wherein the distribution signals comprise analog signals.

17. The method of claim 15, wherein the analog signals comprise television signals.

18. The method of claim 3, wherein the gateway connection comprises twisted wire pair cable.

19. The method of claim 3, wherein the gateway connection comprises coaxial cable.

20. The method of claim 3, wherein the gateway return comprises coaxial cable.

21. The method of claim 3, wherein the gateway return comprises twisted wire pair cable.

22. The method of claim 3, wherein the second-end interfacing step comprises the step of matching a transmission characteristic of the gateway connection with a corresponding transmission characteristic of the bidirectional transmission facility.

23. The method of claim 22, wherein the matching step comprises the step of using a second impedance converter in electrical series between the gateway connection and the second end of bidirectional transmission facility.

24. The method of claim 23, wherein the second-end interfacing step comprises the step of connecting, to a second diplexer, the second impedance converter, the second end of the bidirectional transmission facility and the distribution facility.

25. The system of claim 1 or 2, wherein the network signals comprise xDSL signals.

26. The system of claim 1 or 2, wherein the distribution signals comprise TV/rf signals.

27. The bidirectional transmission system of claim 1 or 2, wherein the network signals comprise xDSL signals, the xDSL signals comprise a first plurality of programs, the distribution signals comprise TV/rf signals, and the TV/rf signals comprise a second plurality of programs.

28. The bidirectional transmission system of claim 2, wherein the gateway receives the network signals transmitted by the second diplexer, converts the network signals to distribution signals, and transmits the distribution signals to the second diplexer.

* * * * *